(12) United States Patent
Goria et al.

(10) Patent No.: US 7,397,783 B2
(45) Date of Patent: Jul. 8, 2008

(54) METHOD FOR CODE RE-ALLOCATION IN TELECOMMUNICATION SYSTEMS, RELATED SYSTEM AND COMPUTER PRODUCT

(75) Inventors: Paolo Goria, Turin (IT); Claudio Guerrini, Turin (IT); Nicola Pio Magnani, Turin (IT)

(73) Assignee: Telecom Italia S.p.A., Milan (IT)

( * ) Notice: Subject to any disclaimer, the term of this patent is extended or adjusted under 35 U.S.C. 154(b) by 675 days.

(21) Appl. No.: 10/499,235

(22) PCT Filed: Dec. 11, 2002

(86) PCT No.: PCT/EP02/14039

§ 371 (c)(1),
(2), (4) Date: Jun. 15, 2004

(87) PCT Pub. No.: WO03/052985

PCT Pub. Date: Jun. 26, 2003

(65) Prior Publication Data

US 2005/0041630 A1 Feb. 24, 2005

(30) Foreign Application Priority Data

Dec. 18, 2001 (IT) .............................. TO01A1185

(51) Int. Cl.
*H04B 7/216* (2006.01)
(52) U.S. Cl. ........................ 370/342; 370/335; 370/208; 455/452.2
(58) Field of Classification Search ................ 370/342, 370/335, 208; 455/452.2
See application file for complete search history.

(56) References Cited

U.S. PATENT DOCUMENTS 6,163,524 A 12/2000 Magnusson ................. 370/208
2003/0067961 A1* 4/2003 Hudson et al. .............. 375/130

FOREIGN PATENT DOCUMENTS

WO WO 00/24146 4/2000
WO WO 00/42723 * 7/2000

OTHER PUBLICATIONS

XP-000998091 mINN t.; Dynamic Assignment of Orthogonal variable Spreading factor Codes in W-CDMA, IEEE Journal.*
Dynamic Assignment of Orthogonal Variable-Spreading-Factor . . . by Thit Minn et al. (IEEE No. 8, 2000).
System Specification. Radio Resource Management . . . by P. Goria et al. (Report dated Apr. 2001).
Technical Specification 3rd Generation Partnership Project: . . . (released 1999), Jun. 2001.

* cited by examiner

*Primary Examiner*—Danh C. Le
(74) *Attorney, Agent, or Firm*—Andrew Wilford

(57) ABSTRACT

In a code division multiple access transmission system (CDMA), codes are generated according to a tree structure organized on a plurality of layers. Each re-allocation is considered as an access request to the system by a new user and the re-allocation codes are transmitted to each involved user through the respective re-allocation messages. Re-allocation messages to users having the same spreading factor (SF), and hence the same service bit-rate (kR) are substantially sent simultaneously, in order to reduce to a minimum the time required for the re-allocation operation.

6 Claims, 2 Drawing Sheets

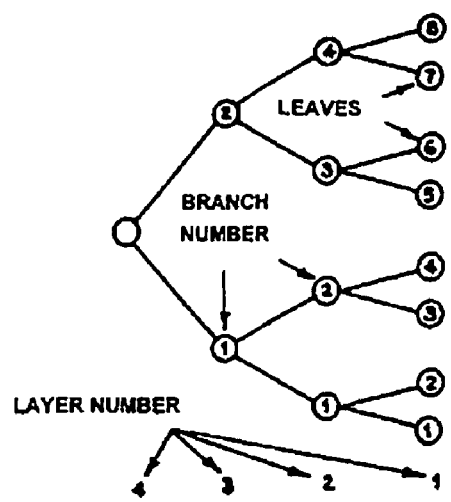
Fig_1
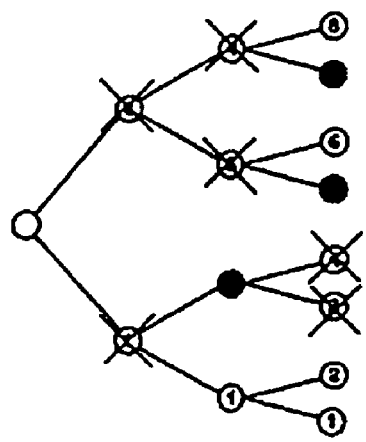
a)
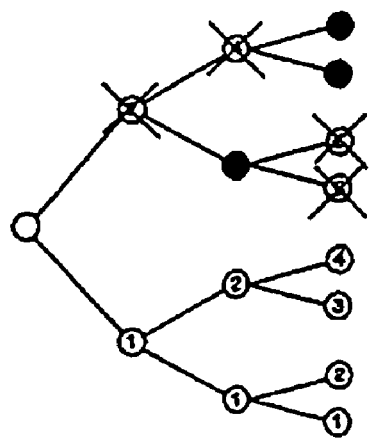
b)
Fig_2

Fig_3
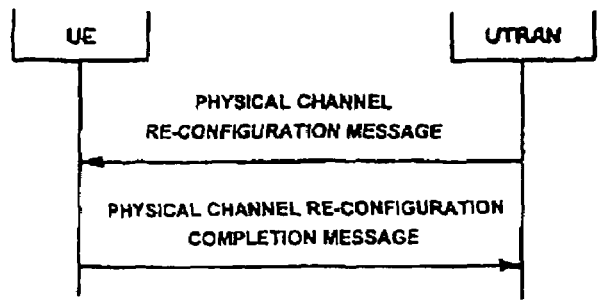
Fig_4
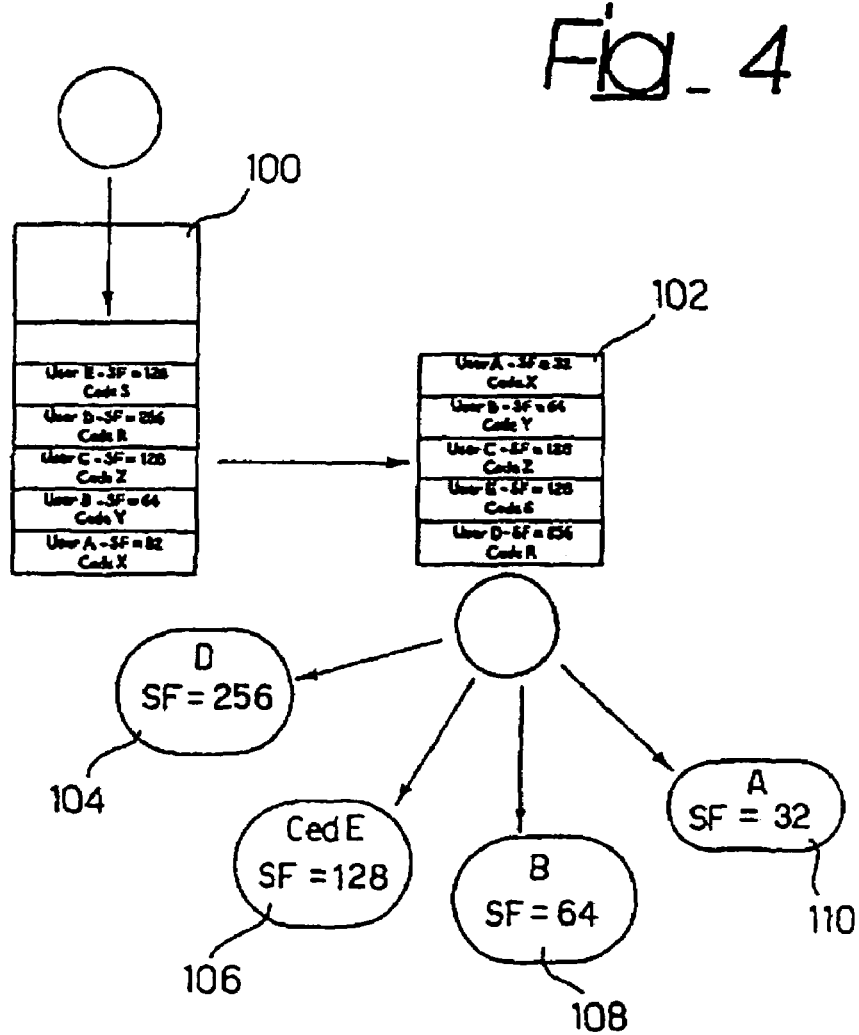

METHOD FOR CODE RE-ALLOCATION IN TELECOMMUNICATION SYSTEMS, RELATED SYSTEM AND COMPUTER PRODUCT

CROSS REFERENCE TO RELATED APPLICATIONS

This application is the US national phase of PCT application PCT/EP02/14039, filed 11 Dec. 2002, published 26 Jun. 2003 as WO 2003/052985, and claiming the priority of Italian patent application TO2001A001185 itself filed 18 Dec. 2001, whose entire disclosures are herewith incorporated by reference.

FIELD OF THE INVENTION

The present invention relates to the techniques or Code Allocation Scheme or CAS, for the Code Division Multiple Access or CDMA type telecommunication systems, and it was developed with a special attention to the necessity of reducing waiting time for activating new calls.

BACKGROUND OF THE INVENTION

In the UMTS (Universal Mobile Telecommunication System) use context, on the basis of the UTRA (UMTS Terrestrial Radio Access) specifications, such as the TS 3 GPP RAN 25.213 v3.6.0, June 2001) specification, one or more OVSF (Orthogonal Variable Spreading Factor) codes are allocated to each user in the "downlink" connections for channeling purposes.

Access with a higher data rate is made possible in two different ways: either by a single code using a lower spreading factor or by more codes, using the same spreading factor (multicode concept).

Supposing that—for the sake of treatment simplicity—each user is allocated a single OVSF code, it is possible to note that such codes are marked by the tree structure shown in FIG. 1.

To enable code identification, each code is allocated the number of a single layer or of a layer and of a branch number or branch, just as shown in FIG. 1.

For the sake of simplicity, should it be assumed that a service requiring a bit-rate equal to R bps, could be mapped into a code belonging to layer 1, a code belonging to layer M could be used to map a service requiring $2^{M-1} \cdot R$ bps.

This hypothesis is valid if the mapping of services are not considered in detail (that is the actual channel coding and/or the so-called puncturing function).

In any case, the management techniques of the codes treated here can be used also for allocating the codes for services, referring to their actual mapping as in the case of the solutions described in document IST-2000 ARROWS D04, "System Specification. Radio Resource Management Algorithms: Identification and requirements".

Maximum spreading factor $N_{max}$ is equal to the overall number of codes in layer 1.

The following definitions will hereinafter be used, consistent with those presented in the work of Thit Minn and Kai-Yeung Siu, "Dynamic Assignment of Orthogonal Variable Spreading-Factor Codes in W-CDMA", IEEE Journal on Selected Areas in Communications, Vol. 18, no. 8, August 2000, pages 1429-1440:

descendant codes: all the lower level codes generated starting from a higher level code;

mother codes: all the high level codes connecting a special code to the code corresponding to the tree root;

sibling codes: two codes generated by their immediately preceding mother code; and leaves: the lowest level codes.

Using this tree structure, it is possible to have all the codes belonging to the same level (and hence having the same length and the same spreading factor or SF) to be orthogonal to one another, that is having a cross-correlation equal to zero and a self correlation equal to one.

When a certain code is allocated, it is no longer possible to allocate any descendant code whatsoever or any corresponding mother code: these codes would not be orthogonal with one another.

It is then useful to define a branch in the form of a sub-tree of a code tree, the highest code level of which (called the branch root code) appears to be available as well as all the corresponding mother codes; should the branch root code belong to the layer x, the branch itself is called the layer x branch).

Based on the above mentioned considerations, it can be immediately noted that the advantage of the OVSF codes, just as used in a downlink UTRA connection, stays in their perfect squareness. There however remains the drawback given by the limited number of available codes. It is therefore important to be able to re-allocate the channeling code with an efficient way of proceeding, in order to avoid the phenomenon currently called "code blocking".

This denomination shows the situation where:

based on the interference analysis as well as based on the coding tree spare capacity—it could be possible to accept a new call, but due to the code allocation, which appears to be inefficient, this ability is not actually available, entailing that the new call must be blocked.

This situation is schematically shown in FIG. 2. By adopting the same formalism as in FIG. 1, two different code allocation examples are shown here. In particular, in FIGS. 2a and 2b diagrams, the solid spots stand for the allocated codes, while the crosses highlight codes that are unavailable, and cannot be hence allocated, since they are blocked by other allocations.

In both cases the same services are supported; nevertheless in the example shown on the left side of the figure shown as 2a, no available code belonging to layer 3 is available. On the other hand, code (3,1) is available in the example shown on the right side of FIG. 2b this means that this last code allocation is more efficient than the first one.

About this matter it can be also noted that the "code blocking" phenomenon fully differs from a call block turning up when a new call cannot be accepted since the capacity available to the tree is not sufficient.

In order to oppose the code blocking phenomenon, allocation/re-allocation strategies have therefore been set to require a code passage or "code handover", arranging by way of example that each current call using a certain code, should be forced to use a different code belonging to the same layer.

In general terms, a code allocation strategy aims at:

minimizing coding tree fragmentation, keeping the largest possible number of high rate codes, and eliminating the code blocking phenomenon.

By way of example, in the above-mentioned Minn and Siu works, there is the proposal of a strategy based on an OVSF code allocation diagram, wherein the re-allocation criteria enable the complete elimination of the code blocking phenomenon. This is an optimal strategy in the sense that it minimizes the number of OVSF codes to be re-allocated in order to be enabled to withstand a new call. This diagram minimizes the number of code handover phenomena together with the associated signaling overhead.

It is possible to prove that should the data rate required by a new input call, fall within the maximum tree capacity, the new call could be supported through code reallocation. Should the full tree capacity be unable to be allocated because of the limit given by the interference, the related strategy is able to remove in any case the code blocking phenomenon.

Supposing that a new call could be supported, it is necessary to allocate to such call a candidate code. For the above reasons, this operation could nevertheless require the re-allocation of the descendant codes occupied by a branch with respect to which the candidate code constitutes the root code. This could in turn require the re-allocation of codes busy in other branches, and so on. In other words, with an adequate re-allocation strategy, it is possible to eliminate the code-blocking phenomenon.

There however remains the necessity for setting criteria capable of minimizing the number of the necessary reallocations in order to be able to withstand a new call.

To this purpose it is possible, by way of example, to proceed by associating a cost function to each candidate branch, allocating thereafter to the new call the root code of a minimum cost branch.

By such a method it can be mainly forecast three successive steps.

At a first step it is checked whether the new call (supposed to be requiring an OVSF code having an SF spreading factor for a service having a bit-rate equal to kR) is eligible to be absorbed by the available tree capacity. If this is not the case, the call is blocked.

In the positive case, it is proceeded with seeking a minimum cost branch having a root code that can be associated to the input call. If necessary, the descendant codes occupied by the identified branch are re-allocated. It is proceeded starting from the highest level code appearing to be engaged, and substantially dealing with it as if it were a new call.

In particular, in Minn and Siu works it is proved that should a new call require a code belonging to layer x, the algorithm is still optimal even if only x layer branches are considered (that is without having to analyze the higher level branches).

The minimum cost branch setting can be achieved according to different techniques which need not be illustrated in detail herein.

Code dynamic allocation diagrams in W-CDMA type transmissions or similar, are described also in document WO 2000/024145 (US equivalent U.S. Pat. No. 6,163,524).

DISCLOSURE OF THE INVENTION

This invention does not refer just by itself to the code re-allocation criteria and algorithms, and it does not hence specifically concern the criteria enabling to proceed to a general code re-allocation, so as to be able to serve or support a new call, whereby—due to a code-blocking phenomenon—a respective code is not immediately free. From this standpoint, the invention is able to make use of any known re-allocation technique and it actually appears to be hence transparent both towards the adopted allocation technique specification, and towards the special orthogonal type of codes used: what is herein stated referring to the OVSF codes actually applies in an identical manner, by way of example, to the Walsh-Hadamard (WH) codes used in other CDMA transmission standards.

This invention rather faces the problem connected with the development of the re-configuration operation at a physical channel level.

In particular on the basis of the UTRA specifications (see by way of example TS 3GPP RAN 25.331 v3.7.0, June 2001) each individual code re-allocation operation is achieved by an RRC level method called Physical Channel Reconfiguration (or PCR).

The RRC element localized in UTRAN (UMTS Terrestrial Radio Access Network) actuates the transmission of the new downlink channeling code and sends it to the so-called UE in the Physical Channel Reconfiguration message indicating the new code. The UE element achieves the changes and then confirms to UTRAN to have completed the reconfiguration by means of a message called Physical Channel Reconfiguration Complete. When the UTRAN element receives from the UE element the confirmation message, the old downlink OVSF code is deactivated.

The criteria for developing this operation is represented schematically in FIG. 3 where are indicated the exchange operations between the unit UE and the unit UTRAN of the physical channel reconfiguration messages (PCR) and of the corresponding reconfiguration completion massages.

With a certain degree of schematics, but nevertheless with a substantial adherence to the truth, it can be stated that the solutions according to the known technique essentially move in the perspective of optimising the coding tree utilization, in order to guarantee that—at each instant—the highest possible number of the coding tree leaves are available.

This way of proceeding can provide (see U.S. Pat. No. 6,163,524 and specially FIGS. 7 through 9 and related description) the enforcement of rather elaborate reallocation procedures based on the development of reallocation or re-assignment operations performed in sequence in the course of time. All this because, by way of example, it does not appear to be possible to (re)allocate a certain code until when the corresponding mother code has not been made available according to such methods so as to prevent the code blocking phenomena from arising.

Strategies of this type find their substantial motivation in CDMA type contexts mainly if not exclusively serving voice users, that is presenting themselves in the great majority as users having the same outline in terms of the required service.

They are above all users for whom:

waiting times of (by way of example) 1.5 to 2 seconds such as those necessary to perform a complete re-allocation operation on a sequential basis, are on the whole admissible because they are actually perceived as overlapping to normal signaling times, and the related calls are usually on the whole sufficiently long (at least some seconds, or tens of seconds) with respect to the above mentioned waiting times The above considerations are no longer fully well fitting when referring to a multi-service context, that is to a context where, besides the normal voice services, different services are assured, such as data transmission services (electronic-mail transmission, transmission of different types of graphical information, etc.).

In a multi-service context, the above considerations are mitigated or—at least—can be applied only to part of the users. In these multi-service networks an important role is played by the users for whom a waiting time of the 1-2 seconds type ends by being strongly penalizing, both for the necessity of being able to provide services to be qualified as real time services, and because the previously mentioned waiting times could be widely greater (even by one order of magnitude or more) as compared with the network occupation interval associated to the transmission of the related message.

Obvious common sense criteria indicate that it does not have much sense, by way of example, to have a calling user wait for a couple of seconds and then, after gaining access with the allocation of the related code, ends his connection and communication requirements within a time interval (by way of example 100 msec.) widely lower than waiting time. In other words, it is not very meaningful to keep waiting a user who uses a rather high bit-rate and is hence able to see his service requirements complied with—and consequently clear the network—within a time interval that is remarkably lower as compared with the aforesaid waiting interval.

OBJECT OF THE INVENTION

This invention intends to provide a solution capable of satisfying such requirements in an optimal way, susceptible of appearing in a multi-service context.

The invention concerns also the relating system as well as the corresponding computer product, that is the product that can be directly loaded into the memory of a digital processor and containing portions of software codes to achieve the procedure in compliance with the invention when the product itself is run on a digital processor.

BRIEF DESCRIPTION OF DRAWINGS

The invention will now be described, only by way of non-limiting example, with reference to the enclosed drawings, where:

FIGS. 1 and 2, have already been previously described, specially to explain the currently called "code blocking" phenomenon, FIG. 3, relating to the development of the physical channel reconfiguration operation has also been previously described, and FIG. 4 shows as a functional block diagram, a possible implementation of the method according to the invention.

BEST MODE FOR CARRYING OUT THE INVENTION

As already indicated many times in the previous introductory part of this description, in the technique are known (by way of example from the Minn and Siu article) techniques that are able to solve the code-blocking problem by re-allocating the OVSF codes on the basis of a dynamic code (re) allocation diagram.

This invention is specifically concerned with the problem of implementing such re-allocation diagram (whatever it is) specially regarding the handover phenomenon relating to the codes as shown in FIG. 3.

This invention aims therefore at minimizing the signaling overhead associated to such operation, in particular for what concerns minimizing the achievement times. This refers above all to users marked by access methods corresponding to a relatively broad required band and to generally reduced access intervals.

Suppose then that a new input call, by way of example, in an UTRA downlink connection (of a quite well known type) should require the allocation of an OVSF code with an SF spreading factor for a service with a kR bit-rate.

In short, the first code allocation procedure step is that of checking whether the available capacity is sufficient to accept the call. If there is not an available sufficient capacity, the call is blocked by sending a corresponding (reject) message to the terminal—this typically is a mobile terminal—requiring the service.

If the call can however be accepted, the second step in the code allocation method is that of finding a free code with an SF spreading factor capable of supporting the required kR bit-rate. Naturally, a "free" code means a code with no occupied descendant codes. In other words, a free code is the root of a free branch.

If there exists a free code, the code is allocated to the new call by sending a configuration message to the terminal requesting the service: in this case, it is not obviously necessary to proceed with a code re-allocation.

If there is however no free code, it is necessary to proceed with the re-allocation according to the scheme shown in the functional diagram in FIG. 4.

In the first instance, it is provided that each branch with an SF spreading factor should be so-to-say labeled with its cost, meaning by "cost" the re-allocations number necessary to make it available.

It can be taken in consideration only SF branches with a not yet allocated root code. At this step, the minimum cost branch is sought and it is stored in an allocations list indicated as 100.

After the algorithm has found the minimum cost SF branch, all the already allocated descendant codes of the selected minimum cost SF branch must be re-allocated to other branches. To this purpose, when analyzing the descendant codes (at a lower bit-rate), descendant codes with a higher bit-rate are considered first, that is the codes with a 2·SF spreading factor. Thereafter it will be considered all the codes with 4·SF, thereafter 8·SF and so on, spreading factors until the tree diagram leaves are attained. For each descendant code to be re-allocated, it is provided to consider the code as a new call intended to be processed according to the previously seen criteria, so as to achieve the storing the new allocated code into the allocations list 100.

When the calculation of the re-allocations is completed, the elements available in the list 100 are re-organized in a decreasing order on the basis of their spreading factor value, in a way that the first element in the re-organized list shown the top spreading factor (that is having the minimum bit-rate). This step leads to the making of the re-organized list shown in FIG. 4, referred to as 102: the adopted layout is that typical of the tails, whereby the first element in the list actually appears in the lowest position.

At this point the re-allocation messages are sent to the involved terminals on the basis of the re-organized allocations list.

In particular re-allocations associated with the top spreading factor are sent first.

In the achievement example shown in FIG. 4, the numeric reference 104 corresponds to the dispatch of a re-allocation message to a certain user called D, having an SF spreading factor equal to 256.

It is thereafter proceeded to send code re-allocation messages to the other addressed users, proceeding in a decreased spreading factor order.

All this by forecasting however that the re-allocation messages of a code allocated to the same spreading factor are sent (obviously with different messages), simultaneously, that it at the same time.

This solution can be achieved provided such re-allocation messages associated to the same spreading factor do not collide with one another.

By way of example, the step indicated by 106 in the FIG. 4 diagram, corresponds to the dispatch of reallocation messages achieved simultaneously to a user C and a user E having the same SF spreading factor equal to 128.

In the step indicated by 108, it is provided to dispatch a re-allocation message to still another user such as a user B having an SF spreading factor equal to 64.

Finally in the step shown as 110, it is provided to dispatch the re-allocation message to still another user A having an SF spreading factor equal, by way of example, to 32.

The described solution enables minimizing the signaling overhead connected with the code re-allocation. This is because code re-allocations with the same spreading factor are performed simultaneously.

In this way, the lowest is spreading factor required by the new call, the more extended is the overall time required to end the allocation/re-allocation procedure It will nevertheless be appreciated that such overall time does not depend on the number of codes having the same spreading factor, but only on the number of layers taken into consideration.

The advantage in terms of time, and hence of service efficiency, can be appreciated directly by referring to FIG. 3 illustrating the normal development flow of the physical channel re-configuration operation, that is:

the RRC level localized on the UTRAN layer actuates the new downlink channeling code transmission and then dispatches to the UE module a physical channel reconfiguration message, indicating the new code, and the UE module carries out the changes and confirms to the UTRAN layer that this has taken place through the physical channel re-configuration achievement message; when the UTRAN level receives from level UE the confirmation message, the previous OVSF code used for communications downlink is deactivated.

The two concerned coded messages typically show under minimum signaling conditions, a useful load $L_{send}$ equal to 39 bit (physical channel re-configuration message) and a useful load $L_{answer}$ equal to 8 bit (physical channel re-configuration completion message).

Referring to such useful loads from the transmission of such messages, according to RRC standard (TS 3GPP RAN25.331 v3.7.0, June 2001) it is possible to assess the overall signaling delay for an individual code re-allocation sizing around 220 milliseconds.

According to the invention, the solution causes the overall allocation delay linked to the development of the whole re-allocation process to be dependent only from the number of the lower layers where there are codes to be reallocated. This is because the re-allocation of codes having the same spreading factor are achieved simultaneously.

According to the invention, the solution can be used also in situations where the code re-allocation process is not actuated by the incoming of a new call, but it is automatically actuated by a management procedure of the transmission resources.

Naturally, holding unchanged the principle of the invention, the achievement particulars and the actuation forms can be widely varied with respect to the descriptions and illustrations herein, without for this reason exiting from the sphere of this invention.

The invention claimed is:

1. A method for re-allocating channeling codes associated to users in a code division multiple access transmission system, said users operating at least at two different service bit-rates, said codes being generated according to a tree structure organized on a plurality of layers, each layer being the identifier of a respective spreading factor and of a corresponding service bit-rate, the method comprising the steps of dispatching to each user involved in a code re-allocation a respective re-allocation message, characterized in that it comprises the step of simultaneously dispatching the re-allocation messages to the users operating with the same spreading factor; and dispatching the re-allocation message in a time sequential order starting from the re-allocation messages sent to the users with the respective higher spreading factor.

2. The method as claimed in claim 1, further comprising the steps of:

detecting the request for access by a new user to the system, checking the availability of a free channeling code, in the case of the availability of a free channeling code, allocating said free code to said new user, in the case of unavailability of a free channeling code, identifying a minimum cost tree branch having a minimum free channeling code allocation cost in said tree, and proceeding with re-allocating the codes of said minimum cost branch to other tree branches in descending order of the service bit-rate and considering each re-allocation as a new request.

3. The method as claimed in claim 1, further comprising the step of using, as said channeling codes, Orthogonal Variable Spreading Factor codes.

4. A transmission system operating the method as per claim 1.

5. The system as per claim 4, wherein the system is an UMTS Terrestrial Radio Access network.

6. A computer product that can be directly loaded into the main memory of a digital processor and comprising portions of software codes achieving a process as per claim 1, when the product is made to run on a digital processor.

* * * * *